(12) United States Patent
Lee et al.

(10) Patent No.: US 10,050,341 B2
(45) Date of Patent: Aug. 14, 2018

(54) APPARATUS FOR CONTROLLING ANTENNA OF MOBILE-COMMUNICATION BASE STATION

(71) Applicant: KMW INC., Hwaseong, Gyeonggi-do (KR)

(72) Inventors: Myoung-sik Lee, Gyeonggi-do (KR); Jong-han Kim, Gyeonggi-do (KR); Ji-myung Jung, Gyeonggi-do (KR); Dong-hun Lee, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 3 days.

(21) Appl. No.: 15/298,865

(22) Filed: Oct. 20, 2016

(65) Prior Publication Data

US 2017/0040682 A1 Feb. 9, 2017

Related U.S. Application Data

(63) Continuation of application No. PCT/KR2015/002564, filed on Mar. 17, 2015.

(30) Foreign Application Priority Data

Apr. 22, 2014 (KR) .......... 10-2014-0048301
Nov. 25, 2014 (KR) .......... 10-2014-0165636

(51) Int. Cl.
*H01Q 3/00* (2006.01)
*H01Q 1/24* (2006.01)
(Continued)

(52) U.S. Cl.
CPC .......... *H01Q 3/005* (2013.01); *H01Q 1/246* (2013.01); *H01Q 21/00* (2013.01); *H04B 17/17* (2015.01)

(58) Field of Classification Search
CPC ........ H01Q 3/005; H01Q 1/246; H01Q 21/00; H04B 17/16; H04B 17/17
See application file for complete search history.

(56) References Cited

U.S. PATENT DOCUMENTS 8,514,145 B2 8/2013 Le Sage
2010/0164803 A1 7/2010 Ahlberg et al.
(Continued)

FOREIGN PATENT DOCUMENTS

JP 2013-157792 A 8/2013
JP 2013-162350 A 8/2013

*Primary Examiner* — Dameon E Levi
*Assistant Examiner* — David Lotter
(74) *Attorney, Agent, or Firm* — Mintz Levin Cohn Ferris Glovsky and Popeo, P.C.; Kongsik Kim; Jhongwoo Jay Peck

(57) ABSTRACT

The present disclosure in some embodiments provides an antenna line device installed in each antenna apparatus of a multiple antenna system, including a control part for controlling according to control signal from a base station body, and at least two of a DC ping part, RF ping part and domain detection part. The DC ping part is configured to include an electrical element installed in an operating power transfer path to cause a voltage drop, and to detect an operating power level before or after the voltage drop caused by the electrical element under the control of the control part. The RF ping part is configured to check a connection of feeder lines to corresponding antenna arrays by detecting signals inputted through the feeder lines under the control of the control part. The domain detection part includes a switch configured to be installed in a control data transfer path and to be turned on/off for identifying an antenna apparatus that covers each coverage sector.

11 Claims, 9 Drawing Sheets

(51) Int. Cl.
*H01Q 21/00* (2006.01)
*H04B 17/17* (2015.01)

(56) References Cited

U.S. PATENT DOCUMENTS

| | | | | |
|---|---|---|---|---|
| 2011/0090118 A1* | 4/2011 | Raeder | ................. | H01Q 3/005 |
| | | | | 342/359 |
| 2014/0022124 A1* | 1/2014 | Zimmermann | ........ | H01Q 1/246 |
| | | | | 342/368 |
| 2017/0062911 A1* | 3/2017 | Butler | ................... | H01Q 1/246 |
| 2017/0194919 A1* | 7/2017 | Lehtola | .................. | H03F 3/211 |

* cited by examiner

APPARATUS FOR CONTROLLING ANTENNA OF MOBILE-COMMUNICATION BASE STATION

CROSS-REFERENCE TO RELATED APPLICATIONS

This application is a continuation application of International Application No. PCT/KR2015/002564 filed on Mar. 17, 2015, which claims priority to Korean Application No. 10-2014-0048301 filed on Apr. 22, 2014 and Korean Application No. 10-2014-0165636 filed on Nov. 25, 2014, which applications are incorporated herein by reference.

TECHNICAL FIELD

The present disclosure in some embodiments relates to a technology applied to a base station in a mobile communication (PCS, Cellular, CDMA, GSM, LTE, etc.) system. More particularly, the present disclosure in some embodiments relates to an apparatus capable of remotely identifying and controlling a base station antenna based on 3GPP (3rd Generation Partnership Project) or pursuant to an AISG (Antenna Interface Standards Group) protocol, etc.

BACKGROUND ART

Typically, a base station of a mobile communication system may be divided into a base station body for processing transmit and receive signals, and an antenna apparatus having a plurality of radiating elements for transmitting and receiving radio signals. Generally, the base station body is installed lower on the ground and the antenna apparatus is installed in a high position such as a building rooftop or a tower, both being interconnected through a feeder cable or the like.

The current mobile communication environment not only presents the 2G (Generation), 3G and 4G LTE (Long Term Evolution) communications in commercial deployment but also prepares for the introduction of the next generation 5G system. Various compliant communication systems or communication operators and different countries accordingly have the respective varieties of coexisting frequency bands of a variety of mobile communication services while making the base station environment diverse. Thus, in order to embody efficient base station systems and reduce the cost for operating base stations, a multi-band base station is commercialized for allowing a single base station to operate a plurality of communication systems.

To embody a multi-band base station, some recent antenna apparatuses have a multi-band antenna structure wherein one or more antenna arrays are installed through a single reflector or respective reflectors in each service band pursuant to different communication standards. The antenna array may be configured of an array of a plurality of radiating elements. Further, the antenna apparatus may have such structures, along with the multi-band structure, as a MIMO (Multi Input Multi Output) structure for each band, or a beam-forming antenna structure with, for example, three or more antenna arrays arranged in the same band.

To embody a multi-band base station, the base station body is provided with signal processing devices for respective bands, which process transmit and receive signals compliant with different communication standards and their associated service bands.

In addition, the base station is recently applied with mechanisms capable of carrying out a beam tilting for the antenna apparatus and various other motion controls, in order to carry out services adaptive to various environments, while suppressing signal interference to the minimum, and to maximize the capacity of the service. For example, the antenna apparatus may include, along with a typical RET (Remote Electrical Tilt) device for providing a remotely controllable electronic downtilt angle adjustment, so called "ALD (Antenna Line Device)" which is devices to be controlled, such as an RAS (Remote Azimuth Steering) device whose azimuth steering adjustment is remotely controlled and an RAB (Remote Azimuth Beamwidth) device whose azimuth beamwidth is remotely controlled. An exemplary antenna with these devices may be found in Korean Patent Application Publication No. 10-2010-0122092, which was priorly filed by Amphenol Corporation (Title: MULTI-BEAM ANTENNA WITH MULTI-DEVICE CONTROL UNIT, Inventors: GIRARD, Gregory; SOULIE, Frank, et al., published Nov. 19, 2010).

In order to control the ALD such as the abovementioned RET device, RAS device and RAB device, recently proposed are communications standards such as an AISG (Antenna Interface Standards Group) v3.0 and communication methods using a 3GPP (3rd Generation Partnership Project) protocol. According to the AISG standard, communication devices are largely classified into primary stations and secondary stations. The primary station or a master station refers to an MCU or such transmitting unit for installation in band-specific signal processing apparatuses of the base station body, which transmits a control signal. The secondary station or a slave station, including a RET device and an ALD modem for installation in an antenna apparatus, receives a control signal to perform an operation corresponding to the control signal.

As such, the existing antenna apparatuses typically have a complicated structure including a multi-band antenna structure, and the fact that an ordinary base station antenna has a multi-sector structure (e.g., alpha, beta and gamma sectors) for dividing a relevant service range by multiple coverage sectors and providing services on a sector-by-sector basis further complicates their linkages and control structures, which is aggravated when each coverage sector employs, for example, a plurality of antenna apparatuses. Therefore, studies are underway to check, when installing base station antennas, the connection state of each antenna apparatus and normality/abnormality of the connection state on a sector-by-sector basis.

SUMMARY

Therefore, some embodiments of the present disclosure seek to provide a more effective antenna control apparatus capable of remotely identifying and controlling the connection state of each antenna apparatus and whether the connection state is normal or not on a sector-by-sector basis.

According to some embodiments of the present disclosure, an antenna line device installed in each antenna apparatus of a multiple antenna system includes a control part configured to perform a control according to a control signal received from a base station body, and at least two of a DC ping part, an RF ping part and a domain detection part. The DC ping part is configured to include an electrical element installed in an operating power transfer path to cause a voltage drop, and to detect an operating power level before or after the voltage drop caused by the electrical element under the control of the control part. The RF ping part is configured to check a connection of feeder lines to corresponding antenna arrays by detecting signals inputted through the feeder lines under the control of the control part. The domain detection part includes a switch configured to be installed in a control data transfer path and to be turned on/off for identifying an antenna apparatus that covers each coverage sector.

According to the present disclosure as described above, the base station antenna apparatus of some embodiments of the present disclosure can remotely identify a connection state of each antenna apparatus and whether such the connection state is normal or not, effectively on a sector-by-sector basis.

DETAILED DESCRIPTION

Figure 1:
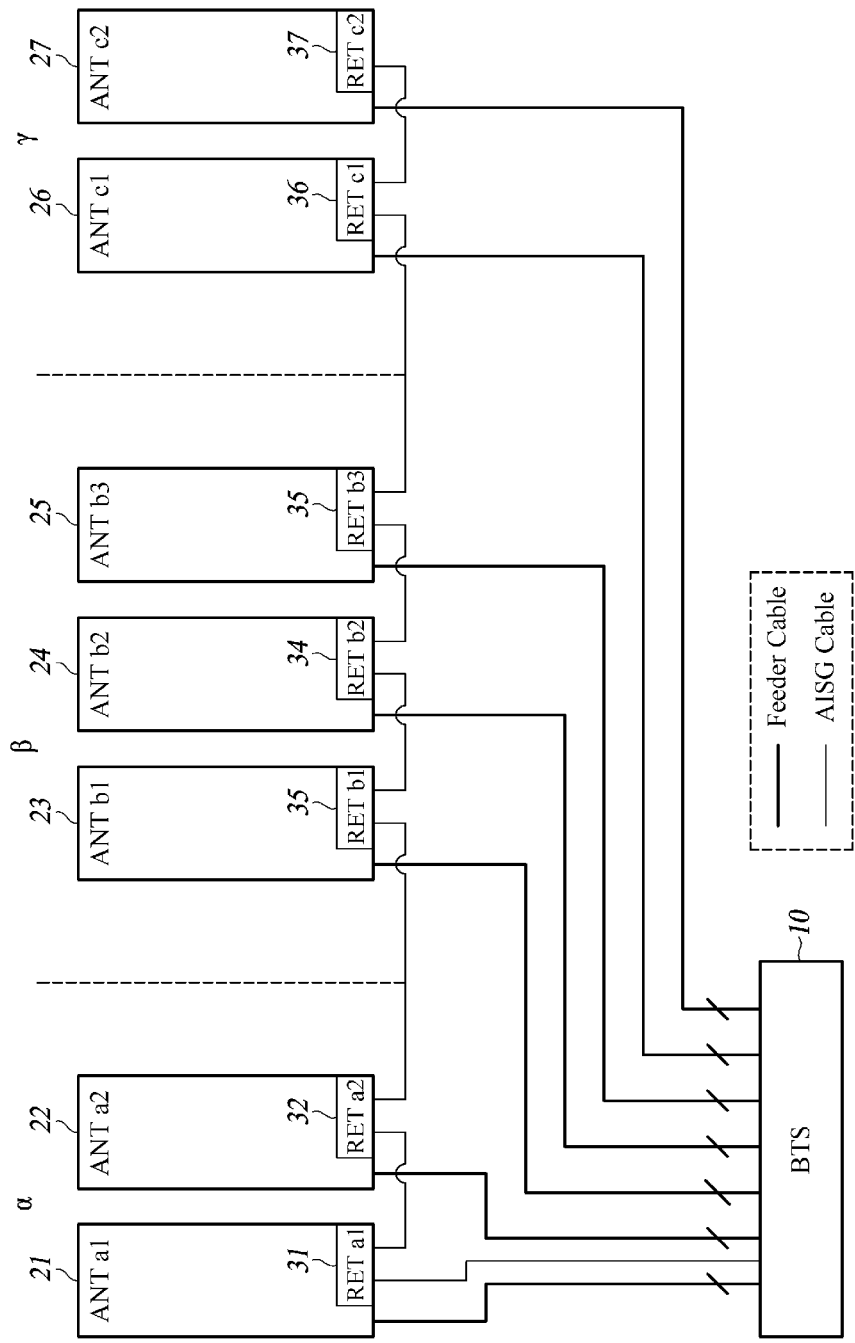
FIG. 1 is a schematic diagram of a base station antenna to which a base station antenna control apparatus is applied according to some embodiments of the present disclosure.

Hereinafter, preferred embodiments of the present disclosure will be described in detail with reference to the accompanying drawings. While specific matters such as detailed constituents are illustrated in the following description, it is obvious to those skilled in the art that they are provided only for general understating of the present disclosure and various changes and modification for the specific matters are made within the scope of the present disclosure. Further, it is noted that like reference numerals rather designate like elements throughout the accompanying drawings.

Figure 2:
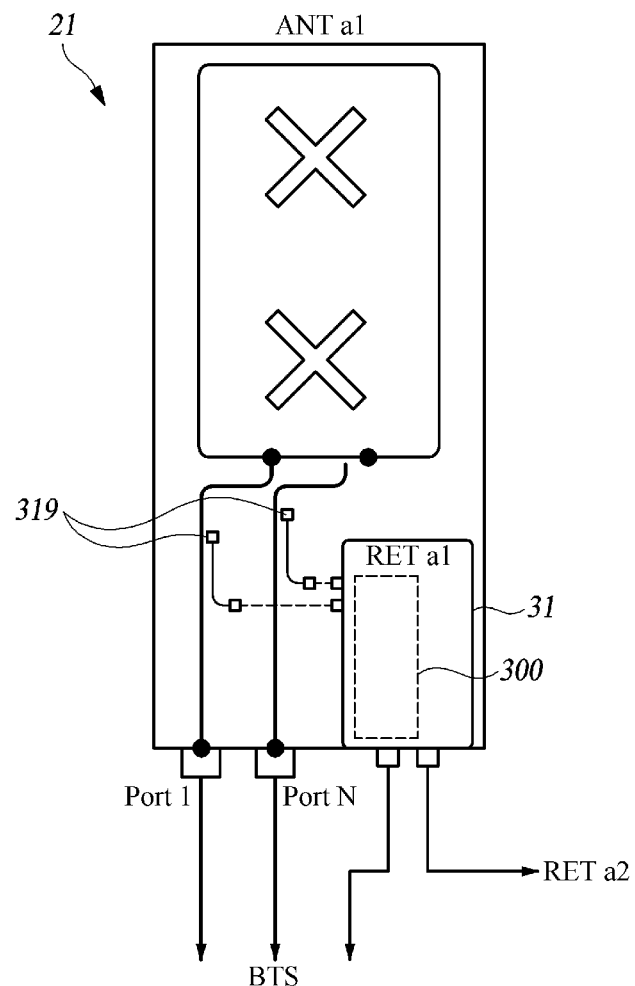
FIG. 2 is a diagram of a more detailed configuration of an antenna apparatus in the base station antenna of FIG. 1.

FIG. 1 is a schematic diagram of a base station antenna to which a base station antenna control apparatus is applied according to some embodiments of the present disclosure, and FIG. 2 is a diagram of a more detailed configuration of an antenna apparatus in FIG. 1. The base station antenna illustrated in FIG. 1, for example, has two antenna apparatuses 21 and 22 installed in an α sector, three antenna apparatuses 23, 24 and 25 installed in a β sector, and two antenna apparatuses 26 and 27 installed in a γ sector. It should be understood that the number of the antenna apparatus installed in each sector may be one (1) or more than four (4). FIG. 1 illustrates a configuration in which the respective antenna apparatuses 21 to 27 are connected to a base station body 10 through feeder cables for transferring radio transmit and receive signals. That is, as illustrated in FIG. 2, the feeder cable extending from the base station body 10 is connected to an antenna through RF ports (Port 1, Port N) of the antenna apparatus 21. Here, the relevant antenna apparatus may include a multi-band structure, and each antenna apparatus has, in practice, a plurality of the feeder cables for a plurality of multi-band antenna arrays.

In addition, the respective antenna apparatuses 21 and 22 are supposed to have ALD devices installed pursuant to the current rule of the AISG, and FIG. 1 illustrates that RET (Remote Electrical Tilt) devices 31, 32, 33, 34, 35, 36 and 37 are respectively installed. The respective RET devices 31 to 37 are installed to be connected to the outside through a plurality of AISG connectors installed on lower caps of the respective antenna apparatuses 21 to 27, and the RET devices of neighboring antenna apparatuses are connected sequentially with one another in a daisy chain configuration through the AISG connectors using an AISG cable.

In such a structure, the first RET device 31 is configured to be directly supplied with a DC operating power 'DC' and a control signal (e.g., a signal according to RS485 method) from the base station body 10, and relays a control signal as well as a DC operating power 'DC' to the downstream RET devices that are connected in a daisy chain configuration. FIG. 1 illustrates that the first RET device 31 is directly connected to the base station body 10 through an AISG cable for the convenience of illustration, although some embodiments contemplate another scheme that a feeder cable be used for transmitting the operating power DC and control signal between the antenna apparatus 21 and the base station body 10. For example, the base station body 10 may be configured to include a bottom ALD modem for providing the antenna apparatus 21 with an RF signal for radio transmission synthesized with a DC operating power for the RET device and a control signal (e.g., a signal modulated in an on-off keying or OOK scheme) through a feeder cable. Likewise, the antenna apparatus may be configured to have a top ALD modem for providing the RET device 31 with the aforementioned signal transmitted through the feeder cable after the DC signal+OOK signal is filtered out so that the RET device 31 receives a command.

As described above, in embodying a base station system with the plurality of antenna apparatuses 21 to 27, there is a rising need when initially installing an antenna apparatus or other instances, for the base station body 10 to identify the antenna apparatuses 21 installed on a sector-by-sector basis, and to check the state of sequential connections among respective antenna apparatuses, an installation state for each sector, and a normal connection state for each multi-band antenna array in each antenna apparatus.

Hereinafter, in the present disclosure, identifying the antenna apparatus installed for each sector is referred to as 'DDD (Domain Detection Device)', checking the state of sequential connections among respective antenna apparatuses is called 'DC ping', and checking a normal connection state for each multi-band antenna array in each antenna apparatus is called 'RF ping'.

These operations of DDD, DC ping and RF ping may be performed by using a communication method between the base station body 10 that is a primary device by the conventional AISG rule and the ALD device that is a secondary device. That is, the base station body 10 instructs each ALD device (the antenna control apparatus according to some embodiments) to perform the DDD, DC ping and RF ping operations, and the respective ALD devices according to some embodiments perform their instructed operations to provide the base station body 10 with signals for confirming the results of the operations. FIG. 2 illustrates that the RET device 31 embodies the configuration and operation of the antenna control apparatus 300 according to some embodiments of the present disclosure. In other words, the existing RET device 31 may be configured to embody additional configurations and functions to perform the DDD, DC ping, and RF ping operations. Apart from the existing RET device 31, a dedicated means may be provided to embody the configurations and operations of the DDD, DC ping and RF ping.

Figure 3:
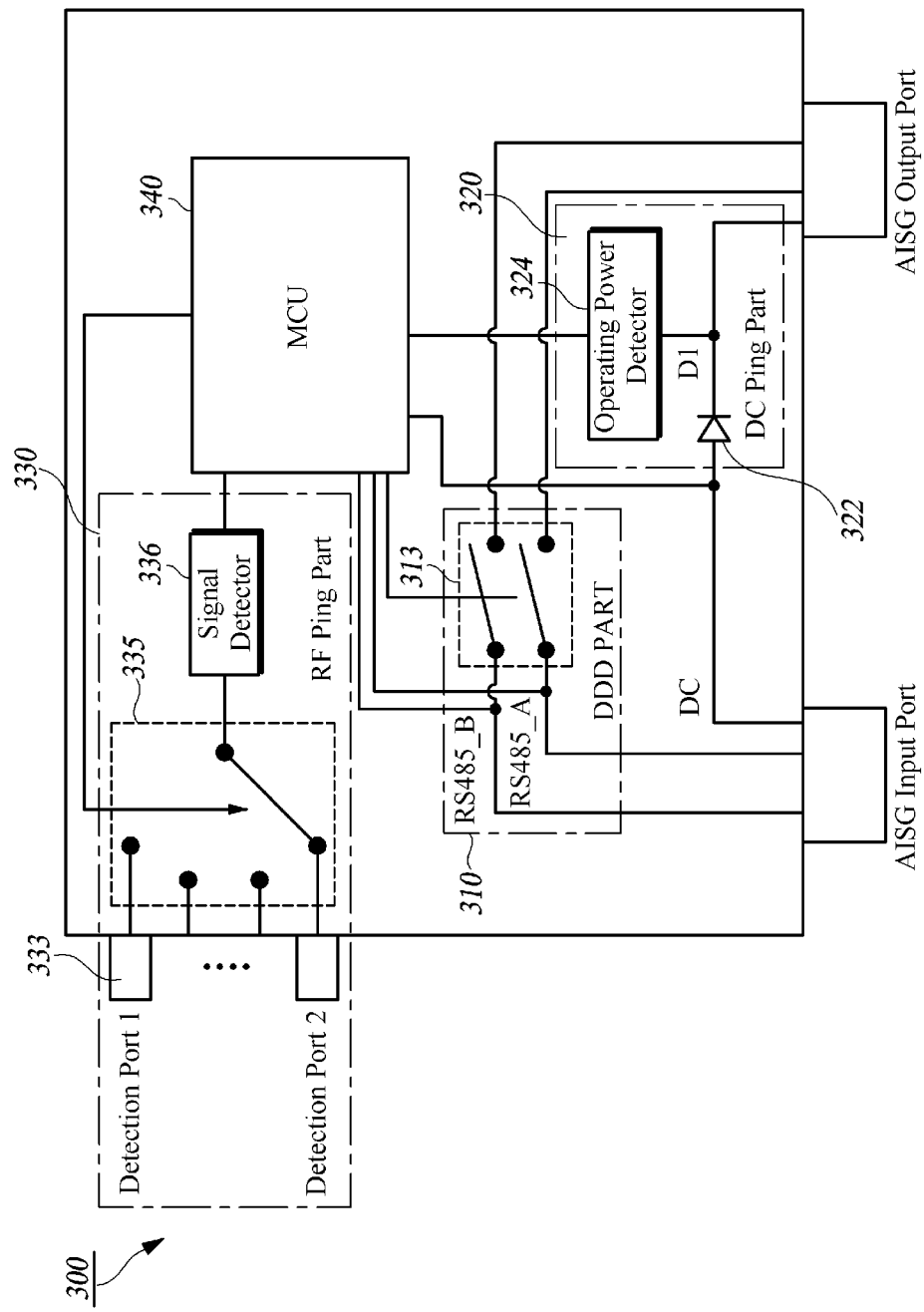
FIG. 3 is a block diagram of a base station antenna control apparatus according to some embodiments of the present disclosure.

FIG. 3 is a block diagram of a base station antenna control apparatus according to some embodiments of the present disclosure. The antenna control apparatus 300 (ALD device) may be considered to be embodied in the RET device 31 illustrated in FIG. 2. The antenna control device 300 may well be likewise embodied in the remaining RET devices 32 to 37. It should be noted that, besides the constituents illustrated in FIG. 3, the RET device 31 includes a motor driver (not shown) for driving a motor and an MLPS (Multi Line Phase Shifter) which are electrical and mechanical devices for adjusting the remote electrical tilting, and that the RET device 31 includes a configuration to operate such a motor driver.

Referring to FIG. 3, the antenna control device 300 (with the RET device) according to some embodiments of the present disclosure includes an AISG input port configured to receive control data according to an AISG standard and a DC operating power 'DC', and an AISG output port configured to transfer the control data and the operating power to the rear stage. The AISG input port and AISG output port may be configured to have an AISG input/output connector for making connection with the AISG cable according to the AISG standard. Such AISG input/output connector has input and output power terminals and input and output control data communication terminals. Here, the terms, input and output, as used in the AISG input port and the AISG output port refer to input and output signals to and from the base station body, and they actually involve bidirectional communications. Here, transmit and receive signal lines for the control data are actually embodied by "RS485_A" and "RS485_B."

The control data and operation power inputted to the AISG input port are arranged to be transferred through the AISG output port to an antenna control device (along with the RET device) that is embodied in another connected downstream antenna device.

Meanwhile, the antenna control apparatus 300 according to some embodiments of the present disclosure includes a domain detection part 310 configured to identify an antenna device installed for each sector, a DC ping part 320 configured to identify sequential connections between respective antenna devices, an RF ping part 330 configured to identify a normal connection state for each multi-band antenna array in each antenna apparatus, and an MCU 340 configured to control the respective parts according to control data from the base station body. The antenna control apparatus 300 is not limited to include all of the domain detection part 310, DC ping part 320 and RF ping part 330 as described in the present embodiment, but the present disclosure envisions that the antenna control apparatus 300 includes one or two of the above three parts.

The control data inputted through the AISG input port is provided to the MCU 340 which is a main controller of the relevant antenna control apparatus 300, and the MCU 340 performs an operation according to the relevant control signal. Here, the domain detection part 310 may be provided on a transfer path of control data that is inputted into the AISG input port and transferred to the AISG output port. The domain detection part 310 may include a DDD operation switch 313 for carrying out a DDD function according to some embodiments of the present disclosure to be described below. The DDD operation switch 313 is configured to perform a switching operation under the control of the MCU 340.

In addition, the operating power DC inputted through the AISG input port is provided as an operating power for the MCU 340. The DC ping part 320 is may be provided on a transfer path of an operating power that is inputted into the AISG input port and transferred to the AISG output port.

Figure 5:
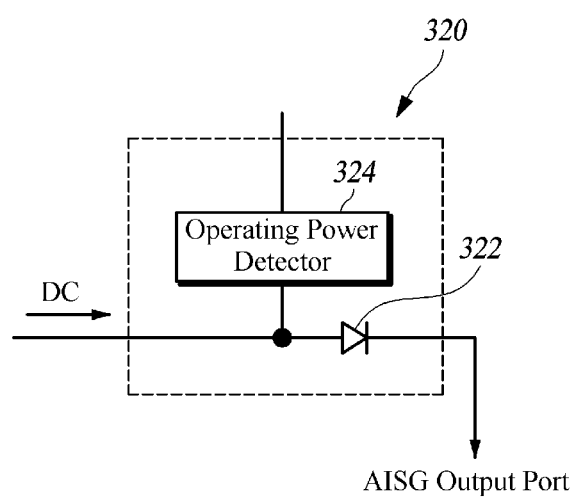
FIG. 5 is an exemplary diagram of a modified DC (Direct Current) ping part in FIG. 3.

The DC ping part 320 includes a forward diode D1 adapted to perform a DC ping function according to some embodiments of the present disclosure and an operating power detector 324 that detects a level of the current input DC power and provides the same to the MCU 340. The forward diode D1 is an electrical element that provides a certain level of voltage drop and it is used here to drop an input operating voltage by a predetermined level. While the diode is illustrated as the electrical element in some embodiments of the present disclosure, the present disclosure is not limited thereto, and another element (for example, a resistor) may be used for the purpose of a voltage drop by the predetermined level. The operating power detector 324 detects an operating power with its voltage dropped by the electrical element and provides the same to the MCU 340. While FIG. 3 illustrates that the operating power detector 324 detects an operating voltage whose voltage is dropped by the diode 322, the operating power detector 324 may also detect an operating power before a voltage drop as illustrated in FIG. 5.

Further, the antenna control apparatus 300 according to some embodiments of the present disclosure includes an RF ping part 330 adapted to perform an RF ping function according to some embodiments of the present disclosure, which will be described below. The RF ping part 330 may detect signals of respective feeder lines connected to a plurality of antenna arrays. The detected signals among the signals of the feeder lines are an RF signal (a radio signal) or a control signal (for example, an OOK signal). Otherwise, the RF ping part 330 may detect both of the RF signal and the control signal. To this end, the RF ping part 330 may include a plurality of detection ports 333, a selection switch 335 and a signal detector 336.

The plurality of detection ports 333 is configured to receive signals inputted from respective couplers (319 in FIG. 2). That is, some embodiments of the present disclosure preinstall, for the purpose of the RF ping function, the respective couplers (319 in FIG. 2) adapted to couple the signals of respective feeder lines connected to a plurality of antenna arrays for multi-band services of a relevant antenna device (for example, 700 MHz, 850 MHz, PCS/AWS, WCS, etc.).

The signals inputted into respective detection ports 333 are selectively provided to a signal detector 336 through a section switch 335 of an SPNT (Single Pole N Throw) type, and the signal detector 336 provides the MCU 340 with a detection signal indicating whether the signal is detected. The MCU 340 controls a switching operation of the selection switch 335 when performing an RF ping task, and, consequently, identifies the detection port 333 of the antenna apparatus 21, which is responsible for the signal detection based on the detected signal provided by the signal detector 336.

Figure 6:
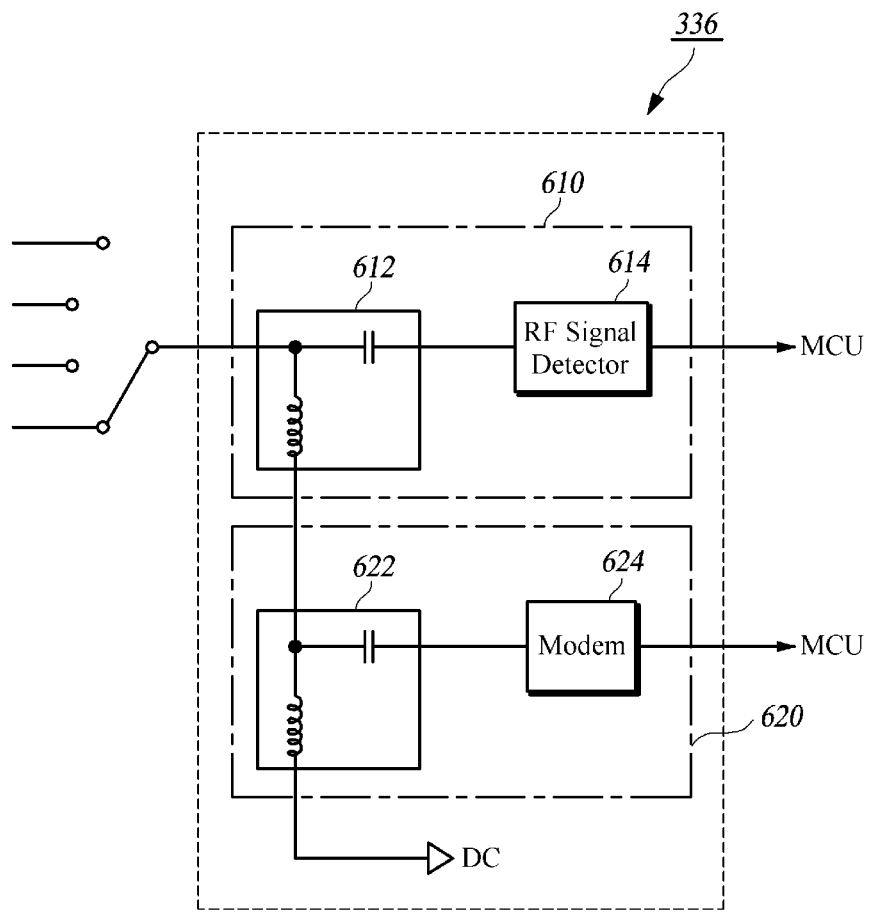
FIG. 6 is an exemplary detailed diagram of an RF (Radio Frequency) ping part in FIG. 3.

The signal detector 336 may include at least one of a first detector 610 adapted to detect an RF signal among signals on the feeder line and a second detector 620 adapted to detect an OOK signal, as illustrated in FIG. 6.

With reference to FIG. 6, the first detector 610 includes a first bias tee 612 adapted to branch the signals on the feeder line into an RF signal having a high frequency and a DC/OOK signal having a low frequency, and an RF signal detector 614. The RF signal detector 614 is connected to an RF signal-carrying line, to detect an RF signal among the signals on the feeder line and to provide the detected signal to the MCU 340.

Meanwhile, a second detector 620 includes a second bias tee 622 connected to a signal line which carries the DC/OOK signal branched off by the first bias tee 612, and a modem 624. The modem 624 is connected to a signal line which carries an OOK signal branched off by the second bias tee 622, and is adapted to demodulate the OOK signal and provide the demodulated OOK signal to the MCU 340.

As described above, the antenna control apparatus 300 according to some embodiments of the present disclosure may include any one of the first and second detectors 610 and 620, or both of them. Further, when the antenna control apparatus 300 includes both of the first and second detectors 610 and 620, they may operate selectively under the control of the MCU 340.

In order to perform the DDD, DC ping and RF ping tasks according to some embodiments of the present disclosure, the MCU 340 receives a control command inputted from the base station body through an AISG input port to control the DDD operation switch 313, the section switch 335 and the like. In addition, the MCU 340 identifies a detected signal of the signal detector 336 and a level of the input DC power of the DC power unit 324 to accordingly transmit a proper ACK (acknowledgement information) to the base station body.

Figure 7:
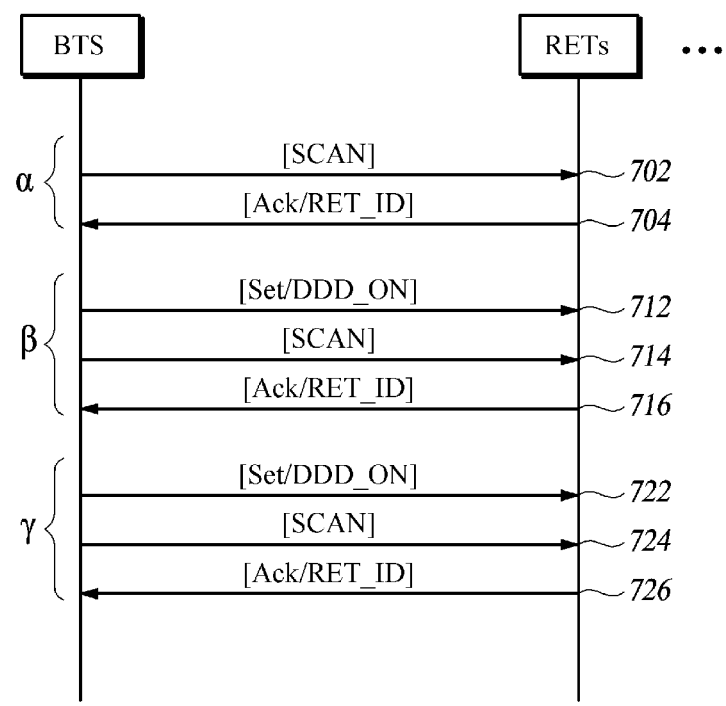
FIG. 7 is a flowchart illustrating a DDD (Domain Detection Device) control operation of a base station antenna control apparatus according to some embodiments of the present disclosure.

The following is a more detailed description of a DDD task according to some embodiments of the present disclosure with reference to FIG. 7. In order to identify an antenna device installed in each sector, the base station body 10 may perform an operation to identify devices connected currently through a normal ALD device scan operation.

Here, the present disclosure in some embodiments features an initial installation of antenna devices that is carried out by, for example, taking, among antenna devices in a relevant sector, the last antenna control apparatus (RET device), i.e., the antenna control apparatuses corresponding to the RET devices 32, 35 and 37 as illustrated in FIG. 1 to turn off their DDD operation switches in the DDD part before the installation process, and have the remaining antenna control apparatuses installed in ON state.

In this state, when the base station body 10 performs an initial scan operation as illustrated in Step 702 of FIG. 7, the respective RET devices (antenna control apparatuses) transmits ACK signals to the base station body 10 in Step 704. This enables the base station body 10 to identify the currently scanned devices as antenna devices in the alpha sector. That is, the last RET device in the current alpha sector (32 in FIG. 1) has its DDD operation switch in OFF state, and therefore its downstream antenna devices, that is, antenna devices in the next beta and gamma sectors are unable to receive a scan command of the base station body 10. This leaves only an RET device corresponding to an antenna device in the alpha sector to be responsive to issue an ACK to be identified by the base station body 10 which then identifies the antenna device (and RET device) in the alpha sector.

Subsequently, in Step 712 of FIG. 7, the base station body 10 transmits a control command for turning on the DDD operation switch. Upon receiving the control command, the RET device turns the relevant DDD operation switch into ON state. Therefore, the DDD operation switch turned on in the last RET device (32 in FIG. 1) in the current alpha sector enables the RET devices in the downstream beta sector to receive a control signal of the base station body 10, too.

Under the circumstances, in Step 714 of FIG. 7, when the base station body 10 performs a scanning, the respective RET devices transmit the consequential ACK signals to the base station body 10 in Step 716. This enables the base station body 10 to identify, among the currently scanned devices, the remaining RET devices as belonging to the beta sector besides those devices that match the antenna devices of the upstream alpha sector.

Subsequently, as in Step 722 of FIG. 7, the base station body 10 transmits a control command for turning on the DDD operation switch. Upon receiving the same control command, the RET device turns the relevant DDD operation switch into ON state. Therefore, the DDD operation switch turned on in the last RET device (35 in FIG. 1) in the current beta sector enables the RET devices in the gamma sector in the downstream stage to receive the control signal of the base station body 10, accordingly.

Then, in Step 724 of FIG. 7, when the base station body 10 performs a scan operation, the respective RET devices transmit the consequential ACK signals to the base station body 10 in Step 726. This enables the base station body 10 to identify, among the currently scanned devices, the remaining RET devices as belonging to the gamma sector besides those devices that match the antenna devices of the upstream alpha and beta sectors.

While a DDD task may be performed through the procedures of FIG. 7, when reviewing the procedures, it may be understood that when installing the antenna device initially, it is important to properly set an initial on/off state in a DDD operation switch of the antenna control apparatus (RET device) depending on an installation state of the antenna apparatus in the relevant sector. Further, a review of the procedures described above tells that devices other than the RET device of the last antenna device in the relevant sector do not need the DDD operation switch and may be embodied in a state that the paths are always connected. Accordingly, when embodying an antenna control apparatus according to the present disclosure, the devices may be manufactured in both types, one including the DDD operation switch and the other not including it, to be used properly. An alternative embodiment may have a configuration that additionally includes a path to bypass the path of the DDD operation switch by a separate external manipulation.

Figure 4:
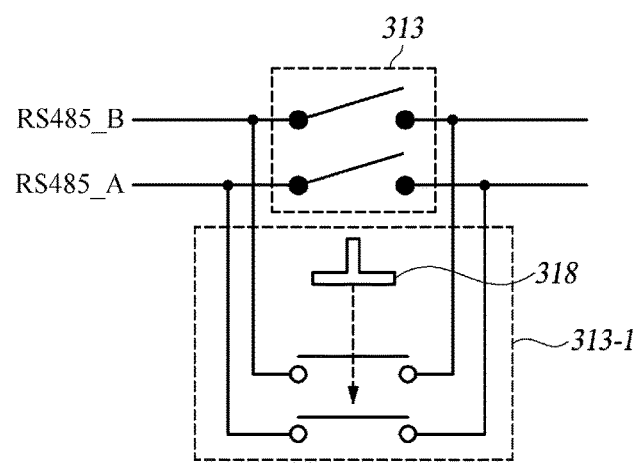
FIG. 4 is an exemplary diagram of a modified domain detection part in FIG. 3.

FIG. 4 is an exemplary diagram of a modified domain detection part of FIG. 3. Referring to FIG. 4, a bypass circuit 313-1 to bypass a path of the DDD operation switch 313 of FIG. 3 is additionally configured, for example. The bypass circuit 313 may additionally include an operation switch 318 installed to be manually operated from the outside, and the operation switch 318 may be configured to be depressed or otherwise manipulated to make or break a bypass path.

With an antenna control apparatus employing the configuration illustrated in FIG. 4, an installation operator can start the installation of antenna devices by turning off the operation switch of the bypass circuit of the last antenna control apparatus (RET device) among the antenna apparatuses in each sector, and by turning on the remaining antenna control apparatuses.

Figure 8:
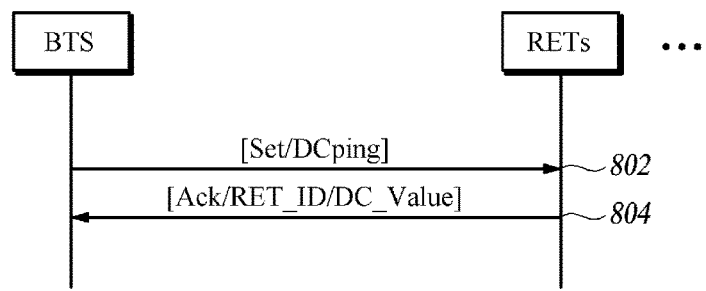
FIG. 8 is a flowchart illustrating a DC ping control operation of a base station antenna control apparatus according to some embodiments of the present disclosure.

A DC ping task according to some embodiments of the present disclosure is described in more detail with reference to FIG. 8. In order to identify sequential connections between respective antenna apparatuses, the base station body 10 may transmit a so-called DC ping command to respective RET devices in Step 802. The respective RET devices that received the DC ping command transmit level values of the operation power DC of their own apparatuses to the base station body in Step 804. The respective RET devices (antenna control apparatuses) are provided on their DC power paths with a forward diode adapted to perform a DC ping function, which brings a voltage drop (for example, 0.3V) of the relevant diodes sequentially to the respective RET devices. Accordingly, when a DC level of a first RET device is 20V, for example, a DC level of the next RET device becomes 19.7V, and a DC level of the RET device after next becomes 19.4V. Accordingly, the base station body 10 can identify a connection order of respective RET devices by the magnitudes of such DC levels.

Figure 9:
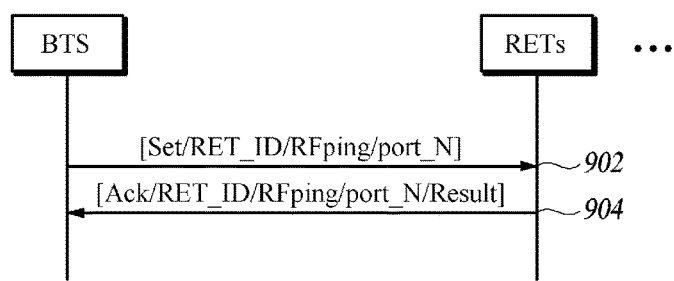
FIG. 9 is a flowchart illustrating an RF ping control operation of a base station antenna control apparatus according to some embodiments of the present disclosure.

The following will describe an RF ping task in more detail according to some embodiments of the present disclosure with reference to FIG. 9. In order to confirm a normal connection state for each multi-band antenna array in each antenna apparatus, for example, the base station body 10 may designate a specific RF port for transmitting a command requesting a signal detection result to a specific antenna device in Step 902 of FIG. 9. Upon receiving such a command, the RET device may control, in Step 904, the switching operation of the relevant selection switch 335 to acknowledge whether a signal is detected at the relevant port by the signal detector, and then transmit the detection result to the base station body 210.

For example, in case a specific antenna device in the base station body 10 has a feeder cable, corresponding to a first of antenna arrays thereof, connected through a first coupler to a first RF port of the RET device, the base station body 10 is capable of sending signals to that feeder cable corresponding to the first antenna array, while confirming a normal antenna array connection with an acknowledgement of a detected signal through the first RF port of the same RET device.

Configuration and operation of the antenna control apparatus according to some embodiments of the present disclosure can be achieved as described above. While concrete embodiments are described in the above description of the present disclosure, various modifications may be embodied without departing from the scope of the present disclosure.

For example, while the antenna control apparatus according to some embodiments of the present disclosure is described to implement all of 'DDD' task, 'DC ping' task and 'RF ping' task, the antenna control apparatus can be configured to implement only one or two tasks among them.

Besides, various other modifications, changes and variations are contemplated. Accordingly, one of ordinary skill would understand the scope of the claimed invention is not to be limited by the explicitly described above embodiments but by the claims and equivalents thereof.

The invention claimed is:

1. An antenna line device installed in each antenna apparatus of a multiple antenna system, antenna line device comprising:
    a control part configured to perform a control according to a control signal received from a base station body; and
    at least two of a DC ping part, an RF ping part and a domain detection part,
    wherein the DC ping part includes an electrical element installed in an operating power transfer path to cause a voltage drop, and an operating power detector configured to detect an operating power level before or after the voltage drop caused by the electrical element under the control of the control part,
    wherein the RF ping part is configured to check a connection of feeder lines to corresponding antenna arrays by detecting signals inputted through the feeder lines under the control of the control part, and
    wherein the domain detection part comprises a switch installed in a control data transfer path and to be turned on/off for identifying an antenna apparatus that covers each coverage sector.

2. The antenna line device of claim 1, wherein the switch of the domain detection part is turned on/off in response to a command received from the control part for identifying the antenna apparatus that covers each coverage sector.

3. The antenna line device of claim 1, wherein the domain detection part comprises:
    a first switch installed in the control data transfer path extending from an AISG (Antenna Interface Standards Group) input port to an AISG output port; and
    a bypass circuit including a second switch that is turned on/off by an external manipulation, and to make or break a bypass path around the first switch depending on whether the second switch is turned on or off.

4. The antenna line device of claim 1, wherein the DC ping part comprises a diode installed in the operating power transfer path extending from an AISG input port to an AISG output port,
    wherein the operating power detector is configured to detect the operating power level before or after the voltage drop caused by the diode and to transfer the operating power level to the control part.

5. The antenna line device of claim 1, wherein the RF ping part is configured to detect at least one of an RF signal and a control signal among the signals of the feeder lines connected to the corresponding antenna arrays.

6. The antenna line device of claim 1, wherein the RF ping part comprises:
    a plurality of detection ports configured to be coupled to the signals inputted through the feeder lines connected to the corresponding antenna arrays;
    a selection switch configured to switch between the detection ports under the control of the control part; and
    a signal detector configured to detect signals inputted through the selection switch to transfer the detected signals to the control part.

7. The antenna line device of claim 6, wherein the signal detector comprises at least one of a first detector and a second detector, the first detector being configured to detect an RF signal among the signals inputted through the selection switch, and the second detector being configured to detect a control signal among the signals inputted through the selection switch.

8. The antenna line device of claim 6, wherein the signal detector comprises:
    a first bias-tee configured to branch off the signals inputted through the selection switch into an RF signal and a DC (direct current)/control signal;
    an RF signal detector configured to detect the RF signal branched off by the first bias-tee to transfer the RF signal to the control part;
    a second bias-tee configured to branch off the DC/control signal that is branched off by the first bias-tee into a DC signal and a control signal; and
    a modem configured to demodulate the control signal branched off by the second bias-tee and to transfer a demodulated signal to the control part.

9. The antenna line device of claim 1, wherein antenna line devices installed in each antenna apparatus are sequentially connected in a daisy chain configuration.

10. The antenna line device of claim 1, wherein the domain detection part is included only in the last antenna line device in each coverage sector.

11. An antenna line device installed in each antenna apparatus of a multiple antenna system, antenna line device comprising:
- a control part configured to perform a control according to a control signal received from a base station body; and
- at least two of a DC ping part, an RF ping part and a domain detection part,
- wherein the DC ping part includes an electrical element installed in an operating power transfer path to cause a voltage drop, and to detect an operating power level before or after the voltage drop caused by the electrical element under the control of the control part,
- wherein the RF ping part is configured to check a connection of feeder lines to corresponding antenna arrays by detecting signals inputted through the feeder lines under the control of the control part,
- wherein the domain detection part comprises a switch configured to be installed in a control data transfer path and to be turned on/off for identifying an antenna apparatus that covers each coverage sector,
- wherein the RF ping part comprises:
- a plurality of detection ports configured to be coupled to the signals inputted through the feeder lines connected to the corresponding antenna arrays;
- a selection switch configured to switch between the detection ports under the control of the control part; and
- a signal detector configured to detect signals inputted through the selection switch to transfer the detected signals to the control part,
- wherein the signal detector comprises:
- a first bias-tee configured to branch off the signals inputted through the selection switch into an RF signal and a DC (direct current)/control signal;
- an RF signal detector configured to detect the RF signal branched off by the first bias-tee to transfer the RF signal to the control part;
- a second bias-tee configured to branch off the DC/control signal that is branched off by the first bias-tee into a DC signal and a control signal; and
- a modem configured to demodulate the control signal branched off by the second bias-tee and to transfer a demodulated signal to the control part.

* * * * *